United States Patent
Nair et al.

(10) Patent No.: US 9,323,901 B1
(45) Date of Patent: Apr. 26, 2016

(54) DATA CLASSIFICATION FOR DIGITAL RIGHTS MANAGEMENT

(75) Inventors: Manoj Nair, Cary, NC (US); Stephen R. Perrin, Chapel Hill, NC (US)

(73) Assignee: EMC CORPORATION, Hopkinton, MA (US)

( * ) Notice: Subject to any disclaimer, the term of this patent is extended or adjusted under 35 U.S.C. 154(b) by 791 days.

(21) Appl. No.: 11/864,764

(22) Filed: Sep. 28, 2007

(51) Int. Cl.
*H04L 29/06* (2006.01)
*G06F 21/10* (2013.01)

(52) U.S. Cl.
CPC ........... *G06F 21/10* (2013.01); *H04L 2209/603* (2013.01)

(58) Field of Classification Search
CPC ..................... G06F 21/10; H04L 2209/603
USPC ........................................................ 713/167
See application file for complete search history.

(56) References Cited

U.S. PATENT DOCUMENTS

| | | | |
|---|---|---|---|
| 6,003,040 A | 12/1999 | Mital et al. | |
| 6,167,445 A | 12/2000 | Gai et al. | |
| 6,308,216 B1 | 10/2001 | Goldszmidt et al. | |
| 6,349,297 B1 | 2/2002 | Shaw et al. | |
| 6,363,053 B1 | 3/2002 | Schuster et al. | |
| 6,430,613 B1 | 8/2002 | Brunet et al. | |
| 6,591,300 B1 | 7/2003 | Yurkovic | |
| 6,633,312 B1 | 10/2003 | Rochford et al. | |
| 6,865,728 B1 | 3/2005 | Branson et al. | |
| 7,028,312 B1 | 4/2006 | Merrick et al. | |
| 7,185,073 B1 | 2/2007 | Gai et al. | |
| 7,240,076 B2 | 7/2007 | McCauley et al. | |
| 7,278,156 B2 | 10/2007 | Mei et al. | |
| 7,363,292 B2 | 4/2008 | Chaboche | |
| 7,412,518 B1 | 8/2008 | Duigou et al. | |
| 7,433,304 B1 | 10/2008 | Galloway et al. | |
| 7,543,020 B2 | 6/2009 | Walker et al. | |
| 7,548,915 B2 | 6/2009 | Ramer et al. | |
| 7,565,324 B2 | 7/2009 | Vincent | |
| 7,580,357 B2 | 8/2009 | Chang et al. | |
| 7,613,806 B2 | 11/2009 | Wright et al. | |

(Continued)

FOREIGN PATENT DOCUMENTS

EP          1855218 A2    11/2007
WO      WO 2008/036621    3/2008

OTHER PUBLICATIONS

U.S. Appl. No. 11/694,753, filed Mar. 30, 2007, Nair et al.

(Continued)

*Primary Examiner* — Jeffrey D Popham
(74) *Attorney, Agent, or Firm* — Workman Nydegger

(57) ABSTRACT

Information management is used to enforce and control rights associated with data through the use of policies implemented by a digital rights management ("DRM") server. An information management system collects information about data objects in a computer system and classifies the data objects into one or more categories. The categories are mapped to service level objectives that include or request encryption and identify DRM policies to associate with data objects within each category. Each DRM policy identifies one or more users authorized to access data objects the DRM policy is associated with. Encryption is orchestrated, in one embodiment, by identifying a data object to the DRM server in an encryption request, and identifying a DRM policy to associate with the data object. The DRM server encrypts the data object and only allows it be decrypted by authorized users.

16 Claims, 3 Drawing Sheets

(56) References Cited

U.S. PATENT DOCUMENTS

| | | |
|---|---|---|
| 7,616,642 B2 | 11/2009 | Anke et al. |
| 7,640,345 B2 | 12/2009 | Nair et al. |
| 7,676,798 B2 | 3/2010 | Snover et al. |
| 7,725,570 B1 | 5/2010 | Lewis |
| 7,725,571 B1 | 5/2010 | Lewis |
| 7,730,172 B1 | 6/2010 | Lewis |
| 7,734,765 B2 | 6/2010 | Musman et al. |
| 7,739,239 B1 | 6/2010 | Cormie et al. |
| 7,895,220 B2 | 2/2011 | Evans et al. |
| 7,953,740 B1 | 5/2011 | Vadon et al. |
| 8,069,435 B1 | 11/2011 | Lai |
| 8,104,080 B2 | 1/2012 | Burns et al. |
| 8,548,964 B1 | 10/2013 | Nair et al. |
| 8,620,724 B2 | 12/2013 | Adhiraju et al. |
| 2002/0016800 A1* | 2/2002 | Spivak et al. ............. 707/523 |
| 2002/0091746 A1 | 7/2002 | Umberger et al. |
| 2002/0120685 A1 | 8/2002 | Srivastava et al. |
| 2002/0161883 A1 | 10/2002 | Matheny et al. |
| 2003/0023587 A1* | 1/2003 | Dennis et al. ............. 707/3 |
| 2003/0023712 A1 | 1/2003 | Zhao et al. |
| 2003/0036886 A1 | 2/2003 | Stone |
| 2003/0041050 A1 | 2/2003 | Smith et al. |
| 2003/0093528 A1 | 5/2003 | Rolia |
| 2003/0140009 A1* | 7/2003 | Namba et al. ............. 705/59 |
| 2003/0167180 A1 | 9/2003 | Chung et al. |
| 2003/0196108 A1 | 10/2003 | Kung |
| 2003/0212778 A1 | 11/2003 | Collomb |
| 2003/0225829 A1 | 12/2003 | Pena et al. |
| 2003/0233391 A1 | 12/2003 | Crawford et al. |
| 2003/0233464 A1 | 12/2003 | Walpole et al. |
| 2003/0236904 A1 | 12/2003 | Walpole et al. |
| 2004/0060002 A1 | 3/2004 | Lucovsky et al. |
| 2004/0098415 A1 | 5/2004 | Bone et al. |
| 2004/0133876 A1 | 7/2004 | Sproule |
| 2004/0215650 A1 | 10/2004 | Shaji et al. |
| 2004/0236660 A1 | 11/2004 | Thomas et al. |
| 2004/0243699 A1 | 12/2004 | Koclanes et al. |
| 2005/0060662 A1 | 3/2005 | Soares et al. |
| 2005/0071182 A1 | 3/2005 | Aikens et al. |
| 2005/0102297 A1 | 5/2005 | Lloyd et al. |
| 2005/0125768 A1 | 6/2005 | Wong et al. |
| 2005/0131982 A1 | 6/2005 | Yamasaki et al. |
| 2005/0132034 A1 | 6/2005 | Iglesia et al. |
| 2005/0177545 A1 | 8/2005 | Buco et al. |
| 2005/0197852 A1 | 9/2005 | Gebhard et al. |
| 2005/0235342 A1* | 10/2005 | Ene-Pietrosanu et al. ......... 726/6 |
| 2005/0251533 A1 | 11/2005 | Harken et al. |
| 2005/0262097 A1 | 11/2005 | Sim-Tang et al. |
| 2005/0273451 A1 | 12/2005 | Clark et al. |
| 2005/0289216 A1 | 12/2005 | Myka et al. |
| 2006/0015388 A1 | 1/2006 | Flockhart et al. |
| 2006/0036463 A1 | 2/2006 | Patrick et al. |
| 2006/0039364 A1 | 2/2006 | Wright |
| 2006/0092861 A1 | 5/2006 | Corday et al. |
| 2006/0095543 A1 | 5/2006 | Ito et al. |
| 2006/0095570 A1 | 5/2006 | O'Sullivan |
| 2006/0101084 A1 | 5/2006 | Kishi et al. |
| 2006/0106782 A1 | 5/2006 | Blumenau et al. |
| 2006/0112108 A1 | 5/2006 | Eklund et al. |
| 2006/0114832 A1 | 6/2006 | Hamilton et al. |
| 2006/0129415 A1 | 6/2006 | Thukral et al. |
| 2006/0129974 A1 | 6/2006 | Brendle et al. |
| 2006/0179143 A1 | 8/2006 | Walker et al. |
| 2006/0236061 A1 | 10/2006 | Koclanes |
| 2006/0248165 A1 | 11/2006 | Sridhar et al. |
| 2006/0248187 A1 | 11/2006 | Thorpe et al. |
| 2007/0038683 A1 | 2/2007 | Dixon et al. |
| 2007/0055689 A1 | 3/2007 | Rhoads et al. |
| 2007/0058632 A1 | 3/2007 | Back et al. |
| 2007/0061363 A1 | 3/2007 | Ramer et al. |
| 2007/0070894 A1 | 3/2007 | Wang et al. |
| 2007/0083875 A1 | 4/2007 | Jennings |
| 2007/0094392 A1 | 4/2007 | Stone et al. |
| 2007/0103984 A1 | 5/2007 | Kavuri et al. |
| 2007/0104208 A1 | 5/2007 | Svensson |
| 2007/0127370 A1 | 6/2007 | Chang et al. |
| 2007/0153802 A1 | 7/2007 | Anke et al. |
| 2007/0162749 A1 | 7/2007 | Lim |
| 2007/0192352 A1 | 8/2007 | Levy |
| 2007/0208751 A1 | 9/2007 | Cowan et al. |
| 2007/0214208 A1 | 9/2007 | Balachandran |
| 2007/0226228 A1 | 9/2007 | Her et al. |
| 2007/0260640 A1* | 11/2007 | Hamilton et al. ............. 707/200 |
| 2007/0294406 A1 | 12/2007 | Suer et al. |
| 2007/0299828 A1 | 12/2007 | Lewis et al. |
| 2008/0002678 A1 | 1/2008 | Klessig et al. |
| 2008/0005086 A1 | 1/2008 | Moore |
| 2008/0021850 A1 | 1/2008 | Irle et al. |
| 2008/0049642 A1 | 2/2008 | Gudipudi et al. |
| 2008/0059387 A1 | 3/2008 | Vaidhyanathan et al. |
| 2008/0071726 A1 | 3/2008 | Nair et al. |
| 2008/0071727 A1 | 3/2008 | Nair et al. |
| 2008/0071813 A1 | 3/2008 | Nair et al. |
| 2008/0077682 A1 | 3/2008 | Nair et al. |
| 2008/0077995 A1 | 3/2008 | Curnyn et al. |
| 2008/0097923 A1* | 4/2008 | Kim et al. ............. 705/59 |
| 2008/0114725 A1 | 5/2008 | Indeck et al. |
| 2008/0134043 A1 | 6/2008 | Georgis et al. |
| 2008/0177994 A1 | 7/2008 | Mayer |
| 2008/0243900 A1 | 10/2008 | Yohanan et al. |
| 2008/0301760 A1 | 12/2008 | Lim |
| 2009/0064185 A1 | 3/2009 | Araujo |
| 2009/0077210 A1 | 3/2009 | Musman et al. |
| 2009/0150431 A1 | 6/2009 | Schmidt et al. |
| 2009/0157881 A1 | 6/2009 | Kavuri et al. |
| 2010/0250497 A1 | 9/2010 | Redlich et al. |
| 2013/0110840 A1 | 5/2013 | Nair et al. |

OTHER PUBLICATIONS

U.S. Appl. No. 11/694,783, filed Mar. 30, 2007, Perrin et al.
U.S. Appl. No. 11/692,051, filed Mar. 27, 2007, Perrin et al.
U.S. Appl. No. 11/694,764, filed Mar. 30, 2007, Nair et al.
U.S. Appl. No. 11/692,058, filed Mar. 27, 2007, Perrin et al.
U.S. Appl. No. 11/772,179, filed Jun. 30, 2007, John Philip Bell II.
U.S. Appl. No. 11/864,596, filed Sep. 28, 2007, Nair et al.
U.S. Appl. No. 11/864,605, filed Sep. 28, 2007, Nair et al.
U.S. Appl. No. 11/864,770, filed Sep. 28, 2007, Nair et al.
U.S. Appl. No. 11/864,774, filed Sep. 28, 2007, Nair et al.
U.S. Appl. No. 11/772,192, filed Jun. 30, 2007, Nair et al.
U.S. Appl. No. 11/864,760, filed Sep. 28, 2007, Nair et al.
U.S. Appl. No. 11/528,783, Jan. 15, 2010, Office Action.
U.S. Appl. No. 11/528,772, Sep. 12, 2008, Pre-Interview First Office Action.
U.S. Appl. No. 11/528,772, Dec. 22, 2008, First Action Interview.
U.S. Appl. No. 11/528,772, Jun. 3, 2009, Final Office Action.
U.S. Appl. No. 11/528,783, Nov. 7, 2008, Pre-Interview First Office Action.
U.S. Appl. No. 11/528,783, Feb. 24, 2009, Office Action.
U.S. Appl. No. 11/528,783, Jun. 25, 2009, Final Office Action.
U.S. Appl. No. 11/692,058, Jan. 8, 2010, Final Office Action.
U.S. Appl. No. 11/528,898, Sep. 5, 2008, Pre-Interview First Office Action.
U.S. Appl. No. 11/528,898, Feb. 9, 2009, First Action Interview.
U.S. Appl. No. 11/528,898, Apr. 3, 2009, Office Action.
U.S. Appl. No. 11/528,898, Oct. 7, 2009, Final Office Action.
U.S. Appl. No. 11/528,900, Jun. 9, 2008, Office Action.
U.S. Appl. No. 11/528,900, Jan. 23, 2009, Final Office Action.
U.S. Appl. No. 11/528,900, Aug. 25, 2009, Notice of Allowance.
U.S. Appl. No. 11/692,058, Jul. 9, 2009, Office Action.
U.S. Appl. No. 11/864,596, Nov. 12, 2009, Office Action.
U.S. Appl. No. 11/694,753, Mar. 25, 2009, Office Action.
U.S. Appl. No. 11/694,753, Nov. 18, 2009, Final Office Action.
U.S. Appl. No. 11/694,783, Feb. 6, 2009, Office Action.
U.S. Appl. No. 11/692,051, Aug. 26, 2009, Office Action.
U.S. Appl. No. 11/772,179, Aug. 19, 2009, Office Action.
U.S. Appl. No. 11/864,770, Nov. 27, 2009, Office Action.
U.S. Appl. No. 11/864,760, Nov. 24, 2009, Office Action.
U.S. Appl. No. 11/864,605, Jan. 14, 2010, Office Action.
U.S. Appl. No. 11/528,772, Jan. 28, 2010, Office Action.
U.S. Appl. No. 11/694,753, Mar. 29, 2010, Office Action.

(56) References Cited

OTHER PUBLICATIONS

U.S. Appl. No. 11/692,051, Feb. 19, 2010, Notice of Allowance.
U.S. Appl. No. 11/692,051, Mar. 31, 2010, Notice of Allowance.
U.S. Appl. No. 11/694,764, Jan. 28, 2010, Office Action.
U.S. Appl. No. 11/772,179, Feb. 23, 2010, Final Office Action.
U.S. Appl. No. 11/864,770, Apr. 21, 2010, Final Office Action.
U.S. Appl. No. 11/772,192, Apr. 15, 2010, Office Action.
U.S. Appl. No. 11/864,760, Apr. 7, 2010, Final Office Action.
U.S. Appl. No. 11/528,772, Aug. 10, 2010, Final Office Action.
U.S. Appl. No. 11/528,783, Sep. 1, 2010, Final Office Action.
U.S. Appl. No. 11/528,790, Jul. 12, 2010, Office Action.
U.S. Appl. No. 11/692,058, Jul. 6, 2010, Office Action.
U.S. Appl. No. 11/694,764, Aug. 4, 2010, Final Office Action.
U.S. Appl. No. 11/864,596, May 26, 2010, Final Office Action.
U.S. Appl. No. 11/864,605, May 28, 2010, Final Office Action.
U.S. Appl. No. 11/864,760, Jul. 27, 2010, Office Action.
U.S. Appl. No. 11/694,753, Oct. 5, 2010, Final Office Action.
U.S. Appl. No. 11/772,192, Oct. 29, 2010, Final Office Action.
U.S. Appl. No. 11/864,605, Nov. 4, 2010, Office Action.
U.S. Appl. No. 11/864,770, Nov. 3, 2010, Office Action.
U.S. Appl. No. 11/694,753, Jun. 17, 2011, Final Office Action.
U.S. Appl. No. 11/864,774, May 11, 2011, Office Action.
U.S. Appl. No. 11/528,772, Mar. 3, 2011, Office Action.
U.S. Appl. No. 11/528,790, Jan. 13, 2011, Final Office Action.
U.S. Appl. No. 11/692,058, Jan. 24, 2011, Notice of Allowance.
U.S. Appl. No. 11/694,753, Jan. 19, 2011, Office Action.
U.S. Appl. No. 11/694,764, Mar. 17, 2011, Office Action.
U.S. Appl. No. 11/864,596, Mar. 11, 2011, Office Action.
U.S. Appl. No. 11/864,605, Mar. 9, 2011, Final Office Action.
U.S. Appl. No. 11/864,760, Jan. 27, 2011, Final Office Action.
U.S. Appl. No. 11/528,772, Oct. 27, 2011, Notice of Allowance.
U.S. Appl. No. 11/528,790, Jan. 23, 2012, Office Action.
U.S. Appl. No. 11/694,753, Jan. 26, 2012, Office Action.
U.S. Appl. No. 11/694,764, Sep. 26, 2011, Final Office Action.
U.S. Appl. No. 11/772,192, Jan. 5, 2012, Office Action.
U.S. Appl. No. 11/864,596, Oct. 7, 2011, Final Office Action.
U.S. Appl. No. 11/864,770, Apr. 19, 2011, Final Office Action.
U.S. Appl. No. 11/864,774, Dec. 9, 2011, Final Office Action.
U.S. Appl. No. 11/528,783, Aug. 15, 2012, Final Office Action.
U.S. Appl. No. 11/528,790, Jul. 18, 2012, Final Office Action.
U.S. Appl. No. 11/694,753, Nov. 30, 2012, Notice of Allowance.
U.S. Appl. No. 11/694,764, Aug. 1, 2012, Office Action.
U.S. Appl. No. 11/772,192, Jun. 12, 2012, Final Office Action.
U.S. Appl. No. 11/864,605, Jul. 3, 2012, Office Action.
U.S. Appl. No. 13/414,512, filed Mar. 7, 2012, Nair et al.
U.S. Appl. No. 11/528,783, Feb. 14, 2012, Office Action.
U.S. Appl. No. 11/528,898, Mar. 1, 2012, Office Action.
U.S. Appl. No. 11/772,179, Mar. 29, 2012, Office Action.
U.S. Appl. No. 11/772,179, Oct. 11, 2013, Office Action.
U.S. Appl. No. 11/772,192, Aug. 12, 2013, Notice of Allowance.
U.S. Appl. No. 11/528,898, Oct. 2, 2012, Final Office Action.
U.S. Appl. No. 11/694,753, Aug. 31, 2012, Notice of Allowance.
U.S. Appl. No. 11/694,764, Nov. 29, 2012, Final Office Action.
U.S. Appl. No. 11/772,179, Nov. 13, 2012, Final Office Action.
U.S. Appl. No. 11/864,605, Nov. 8, 2012, Final Office Action.
U.S. Appl. No. 11/864,770, Feb. 4, 2013, Office Action.
Ben-Ghorbel-Talbi et al.; "An Extended Role-Based Access Control Model for Delegating Obligations"; Springer-Verlag Berline Heidelberg 2009.
Belokosztolszki et al.; "Meta-Policies for Distributed Role-Based Access Control Systems"; 2002 IEEE.
U.S. Appl. No. 11/528,790, Jun. 17, 2013, Office Action.
U.S. Appl. No. 11/694,764, May 21, 2013, Notice of Allowance.
U.S. Appl. No. 11/864,605, May 24, 2013, Notice of Allowance.
U.S. Appl. No. 11/864,770, Jun. 13, 2013, Final Office Action.
U.S. Appl. No. 11/864,774, Apr. 15, 2013, Notice of Allowance.
U.S. Appl. No. 13/414,512, Aug. 1, 2013, Office Action.
U.S. Appl. No. 11/528,790, Jan. 10, 2014, Final Office Action.
U.S. Appl. No. 11/864,770, Nov. 26, 2013, Office Action.
Office Action dated Mar. 17, 2014 from U.S. Appl. No. 13/414,512, filed Mar. 7, 2012.
Office Action dated Jul. 26, 2013 from U.S. Appl. No. 13/719,084, filed Dec. 18, 2012.
Notice of Allowance dated Jan. 6, 2014 from U.S. Appl. No. 13/719,084, filed Dec. 18, 2012.
U.S. Appl. No. 13/972,089, filed Aug. 21, 2013, Nair et al.
Gasser et al., "An Architecture for Practical Delegation in a Distributed System", 1990 IEEE Computer Society Symposium, May 7-9, 1990, pp. 20-30.
U.S. Appl. No. 11/528,790, May 8, 2014, Notice of Allowance.
U.S. Appl. No. 11/528,898, Sep. 24, 2014, Office Action.
U.S. Appl. No. 11/772,179, Jul. 3, 2014, Final Office Action.
U.S. Appl. No. 11/864,596, Jun. 16, 2014, Notice of Allowance.
U.S. Appl. No. 11/864,770, May 16, 2014, Final Office Action.
U.S. Appl. No. 13/414,512, Sep. 30, 2014, Notice of Allowance.
U.S. Appl. No. 13/972,089, Apr. 16, 2014, Notice of Allowance.

* cited by examiner

DATA CLASSIFICATION FOR DIGITAL RIGHTS MANAGEMENT

CROSS-REFERENCE TO RELATED APPLICATIONS

Not applicable.

BACKGROUND OF THE INVENTION

1. The Field of the Invention

The present invention relates to information management. More particularly, embodiments of the invention relate to systems and methods for using information management to enforce and control rights associated with data in a computer system.

2. the Relevant Technology

The world is slowly and continually moving from being paper-based to being electronic-based. This evolution is apparent in almost every aspect of life, from the workplace, to government institutions, to home life. In each area, old paper-based methods of communication and storage are being replaced by electronic information. Businesses have replaced bulky paper files and expensive storage rooms with electronic files and searchable databases. Tax-payers are encouraged to submit returns electronically rather than in paper form, and email is rapidly becoming the principal form of communication.

There are several reasons for this transition, one of which is the convenience and accessibility of electronic systems. Email, for example, often arrives shortly after sending it, and information submitted electronically can be quickly formatted, processed, and stored without the inconvenience of manually reviewing each submission by hand.

As entities become more dependent on electronic data, the ability to manage electronic data becomes crucial for a variety of different reasons. For example, much of the electronic data maintained by an entity or organization often relates to different aspects of the entity and is often subject to various considerations. Without an effective way to manage the electronic data, it is difficult to apply the appropriate considerations to the data.

Further, much of the data is unstructured data, at least in the sense that the data's value to the entity is not readily known and the services required to manage the data are not necessarily known. For example, an entity may have a file storage system that is regularly backed up, despite the presence of files on the file storage system that have little or no value to the entity. As a result, the entity is often paying for services that are not required. Alternately, there may be files that contain certain information that subjects those files to certain regulations. Because the content of those files is often unknown, the files are not receiving adequate services, thereby subjecting the entity to potential liability.

More generally, there are a number of different factors or considerations that may determine how certain data is handled or that determine the services that are needed for the data. One such factor or consideration is data security. Based on this consideration and others, an entity may desire to protect certain data using some form of digital rights management ("DRM"), such as encryption and access control. However, conventional solutions typically require that an administrator or other user manually identify data for DRM services, a process that is both time-consuming and prone to user error. What are needed, therefore, are improved methods and systems for managing and protecting electronic data in a network.

The subject matter claimed herein is not limited to embodiments that solve any disadvantages or that operate only in environments such as those described above. Rather, this background is only provided to illustrate one exemplary technology area where some embodiments described herein may be practiced.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1:
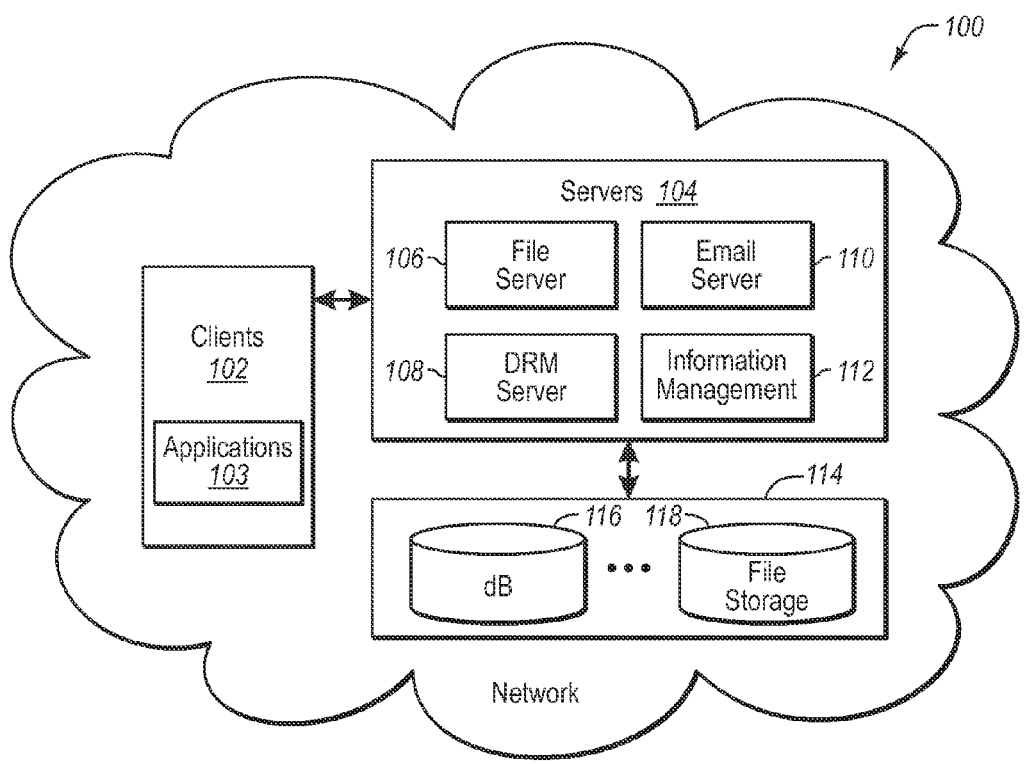
FIG. 1 illustrates an example environment for implementing embodiments of the invention.

Embodiments of the invention relate to the classification and management of objects in a system such as a computer system. Classifying objects enables an information management system to identify and orchestrate services such as data protection, data placement, corporate compliance, and others based on the value of the underlying data. Embodiments of the invention enable the data to be classified in a highly automated fashion that provides various levels of granularity that can be adjusted as needed.

In one embodiment of the invention, an entity can create policies identifying one or more users that are permitted to access, change, and/or delete files associated with the policy. These policies—also referred to herein as digital rights management ("DRM") policies—can be used to enforce digital rights management for data in a computer system. More particularly, the DRM policies can be used to control which users have permissions for which data, thereby enabling an entity to protect sensitive, confidential, and other data for which protection is desired.

Accordingly, an information management system discovers data objects in a computer system and uses rules to classify the data objects into one or more categories based on information collected about the data objects. The information management system maps the categories to service level objectives to select services levels that include DRM services. Finally, the information management system orchestrates the DRM services. In one embodiment, orchestrating DRM services may include identifying, to a DRM server, one or more data objects to encrypt and a DRM policy to associate the data object with. The DRM server then encrypts the data objects in place (e.g., wherever they may be stored) and enforces and controls rights specified in applicable DRM policies.

Advantageously, embodiments of the invention eliminate the need to manually identify data requiring protection, as the identification of the data can be performed automatically by an information management system. Additionally, the information management system can apply extensive classification logic that bases decisions on both metadata and content of data objects when assigning categories. Further, the discovery and classification performed by the information management system can be used for all services, not just DRM services. This obviates the need for a second discovery and classification system when deciding which files to retain or to back up or to move or provide other services for. Moreover, by combining analysis for all services, the information management system can identify and resolve conflicts among the services. For instance, if classification logic identifies a file for encryption and deletion, the information management system can identify the conflict (e.g., it doesn't make sense to encrypt the file and then delete it) and apply logic to determine the best outcome.

I. Information Management Overview

Information management can be implemented in a variety of different computer or computing systems. A computer system, by way of example only, may refer to a single computer and/or to multiple computers (including clients and/or server computers, and other devices) that are connected to a network.

Implementing information management in accordance with the present invention requires an understanding of computer systems, networks, or servers operating on the systems, services operating on the system, and of the objects (e.g., directories, volumes, files, folders, user data, system data, content, servers, databases, applications, services, operating systems, instructions, information, emails, computer settings, etc.) that exist in or are accessible by clients, servers, applications, and services on the system.

The knowledge needed to implement information management can be obtained through discovery of the computer system, which provides the information management system with an understanding of the relationships that may exist between the various servers (and other devices) on the computer system and the data that is accessible over the system. The discovery of a computer system provides the information management system with information that can be used to classify the computer system and the data in the system.

After the computer system (environment and data) has been discovered, it is useful to classify the data that is in the system. Classification is a process that enables each object to be grouped with other objects or to be examined in a manner that enables the needed services for that object to be identified. For example, data objects of a sensitive and/or confidential nature can be grouped together. Alternately, embodiments of the invention enable each object to be categorized and classified individually. Thus, the groupings identified herein are distinct from coarse groupings that fail to consider the service needs of the objects individually. Classification typically assigns each object to one or more categories. If available, information management enables each object to receive the services that each object requires. More commonly, services are typically provided in packages. As a result, the service level objects as identified by the assigned categories are often matched to the best available service package. Embodiments of the invention, however, are not so limited.

Once classification is complete, the information management system may use the categories created during information classification to perform service level management. Service level management provides methods for modeling/mapping the results of discovery and/or classification to service levels. After service level objectives have been identified, the various service levels can be selected. Next, the selected services are orchestrated and executed. Advantageously, the services can be carried out with respect to individual objects rather than on shares or drives. As a result, an entity may only pay for the services that are actually needed rather than pay for services that may not be needed. Further, data, including unstructured data, is categorized and can be provided with the services based on its value to the entity. In one embodiment, classification is a way for an entity to automatically place a value on the various objects of data.

Information management is also a process that can be ongoing. In most computer systems, objects are continually added and those objects typically require certain services. In addition to new objects, many objects also have a lifecycle associated with them. Other objects may change over time (by being edited, for example). As a result, the status or need for services for certain objects can change over time. Information management incorporates lifecycle aspects such that data that grows old or stale can have the various services changed as needed.

Also, embodiments of the invention include reports, auditing, gap analysis, and the like to ensure that the services being provided are adequate. This protective ability ensures, for example, that a company complies with any applicable rule or regulation. The detection of a gap in service, for example, can lead to a change in service levels.

II. Computer System Environment

FIG. 1 illustrates an example environment for implementing embodiments of the invention. FIG. 1 is intended to illustrate that, while many systems often have similar functions, the actual implementation from one computer system to the next can vary significantly. The variability in computer system configurations is one of the aspects that have hindered conventional attempts at information management. The variability may be related, for example, to the type of software installed, the hardware selected for the computer system, the configuration of the hardware/software and the like. As previously described, this is one of the reasons that discovery of a computer system is not limited to the objects in the system but also includes discovery of the servers and services that are operating in the system. An understanding of the servers and services can improve the ease and accuracy with which objects are classified.

In this example, the system 100 represents a network such as a local area network, a wide area network, and the like or any combination thereof. The connections in the system or network 100 can be wired and/or wireless. In this case, the network 100 typically includes clients 102 that have access to various servers 104 and to data 114. Various applications and services are typically provided by the servers 104 and, in some embodiments, access to some or all of the data 114 is controlled by the various servers 104. Some of the data 114 (e.g., backed up data) is not necessarily available to the clients 102. The clients 102 may include various applications 103 for accessing data.

Examples of the servers 104 may include a file server 106, an email server 110, a DRM server 108, and an information management server 112 and the like or any combination thereof. Each of the servers 104 resides in or is accessible over the network 100. The data 114 may include file storage 118, a database 116, and the like. The file storage 118 and database 116 can be implemented in various ways using different software, different configurations, and the like. The hardware used to store the data 114 can include network attached storage (NAS) systems, and any other system known to one of skill in the art.

The data 114 can also be partitioned in different ways as well for different lines of business within the entity. For example, the data 114 may include a share for home directories, a shared area, an engineering share, and a marketing and sales share. Each share may be in its own domain to allow fine grain management by the respective line of business. One advantage of having different shares is that the corresponding files can be owned by different users.

One of skill in the art can appreciate that the clients 102, servers 104, and data 114 can be connected in a wide variety of configurations using various types of connections. Further, the applications that operate on the servers 104, clients 102, and on the data 114 in some instances, may have certain properties or configurations. As previously discussed, it is this variability that can often complicate the ability to manage the information in a computer system.

III. Information Management in a Computer System

Information management according to embodiments of the invention has several components that work together to provide an understanding of the value of an entity's information. In some instances, the entity itself can provide or define some of the logic or rules that are used to classify or categorize the objects. Additionally, the entity itself can provide or define policies implemented by a DRM server controlling who can perform file operations (e.g., access, change, delete) on certain data. Advantageously, this illustrates one way that embodiments of the invention enable an entity to better value its data. Objects can be classified or categorized individually using the entity's own logic and protected using the entity's own policies. As a result, the service levels ultimately identified for those objects and the services executed for those objects reflect the entity's perception of the objects' worth.

For example, an entity may want to retain objects that were authored by a particular person for a long period of time. A rule to that effect that is processed for the objects of the entity can then help classify the objects in an automated manner and the entity may evaluate the cost of assuring that all objects that satisfy that requirement receive the appropriate services. Advantageously, the present invention enables the entity to use the classification system to evaluate the cost of implementing the desired service levels.

While this example illustrates the evaluation of a single rule or objective, an information management system can examine all business objectives for the objects in a computer system, not just one at a time, and use the information classification process to associate those objectives to the files without disrupting any additional associations. For example, some of the files authored by a particular person may also contain personal data on employees who have left the entity. Such files often fall under laws that require their destruction after a certain time period. Thus, some of the files authored by the person may need to be retained for a shorter length of time due to a more pressing consideration (regulations). One embodiment of information classification can thus consider both the desire to retain files written by the author and consider regulations at the same time, for each object. This aspect of the present invention enables a sophisticated information management system to recognize conflicting service goals without disassociating the data from any of the service areas, as in this example, and then resolve the conflict. User defined configurations, for example, may be used to resolve conflict. For example, regulations may have priority over an entity's desire to retain certain files. In another example, the objectives may not conflict, but be additive. For example, an entity may desire to retain all files written by a particular author and make those files searchable by indexing them.

Information management also reduces various risks (such as non-compliance) often associated with data including unstructured data. As described below, embodiments of the invention provide a system for classifying data such that the appropriate services can be provided to the data. Embodiments of the invention also enable services that are required by an entity to be effectively identified and orchestrated. Examples of the services often required by entities for their data include backup services, retention services, corporate compliance services, regulatory compliance, data accessibility, data deletion, access control and/or encryption, disaster recovery, and the like or any combination thereof.

Methods and systems for managing information in a computer system are disclosed in greater detail in U.S. patent application Ser. No. 11/528,900, filed Sep. 27, 2006 and entitled "Information Management," which application is incorporated herein by reference in its entirety.

A. Discovery in Information Management

Figure 2:
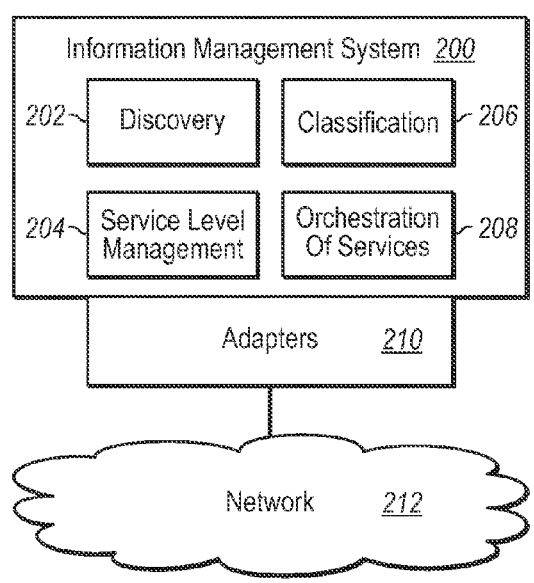
FIG. 2 illustrates one embodiment of a system and/or method for providing information management.

FIG. 2 is a flow diagram illustrating an example system and method for information management of data including unstructured data files or objects. Discovery 202 is often the first element of information management. Generally, in one method of information management, discovery 202 includes both a discovery of the infrastructure or of environment objects (servers, devices, applications, etc.) and of the other objects (data, files, etc.) in the computer system.

The discovery of the environment, for example, can include a discovery of all IP devices on the computer system 100 that appear to act as a server. In discovering these servers, discovery 202 includes discovering services and applications as well. Thus, discovery 202 includes discovering the servers, services, applications and data residing in a system Discovery 202 also includes discovering other objects in the system such as files, file systems, directories, and the like.

The discovery of a computer system can be done in a variety of ways. The discovery of the environment objects, for example, may involve an examination or analysis of all IP addresses existing in a network. Devices that act as a server can thus be identified. Once these servers are identified, additional information can then be sought from those servers.

Applications can also be discovered. For example, many entities often have a payroll application that includes software working in conjunction with a database. The database can be examined and may have certain table or logs when acting, for example, as source for payroll application. The traffic on a network can also be decoded to examine headers to extract information that can characterize the network for the information management server. In this manner, the applications can be discovered. The discovery of an application can be used as additional input when categorizing the objects or data used by the payroll (or any other) application. For example, certain data or objects used by a payroll application may require special service levels that are not needed by other objects.

The discovery of objects in a computer system is accomplished, in one embodiment, through the use of adapters 210. Each adapter enables the information management system to identify objects in or operating in the computer system 100. Alternately or additionally, the adapters enable the information management system to discover information about the objects. For example, some adapters can identify objects acting as a server or data objects such as files. Other adapters are specific to a particular type of server and may be able to collect firmware version, operating system, and other configuration data that is specific to that type of server. Other adapters can collect generated metadata or can examine the content to collect the existing metadata.

Discovery can be performed on an ongoing schedule. For instance, initial discovery of an entire computer system can be performed when the information management system is first implemented in the computer system. Thereafter, the discovery module 202 can monitor the system and identify any changes on a regular and/or irregular basis, such as weekly, daily, or immediately upon detecting a change.

Methods and systems for discovering objects in a computer system are disclosed in greater detail in U.S. patent application Ser. No. 11/694,753, filed Mar. 30, 2007 and entitled "Environment Classification and Service Analysis," which application is incorporated herein by reference in its entirety.

B. Classification in Information Management

Classification 206 is typically the next step in information management. Classification 206 is the process of collecting information about the objects (data and/or the environment) of a computer system and then identifying or associating the objects with categories. One result of classification is to associate objects being classified with certain categories. More particularly, information collected for objects identified during discovery 202 can be used to assign categories to the objects. The resulting categories can be used in subsequent parts of information management as described below.

Classification 206 can incorporate information collected during discovery, such as existing object metadata. Existing metadata can also be collected during classification 206. Alternately or additionally, classification 206 can include applying sets of rules or other logic to the objects in a computer system and using these rules to generate metadata. The rules can be default rules or rules that are selected according to a line of business of the entity or for any other reason. For example, objects that include social security numbers may have to be retained for some period of time per governmental regulations and/or may need to be encrypted with access limited to one or more authorized users. Alternatively, objects relating to a particular project or matter may need to be encrypted with access limited to one or more authorized users that may be the same, different, or partially overlapping with the authorized users of the objects that include social security numbers. Alternatively, objects whose owner is a member of marketing may only be retained for a few years but require full indexing.

In addition to applying rules to the objects of the entity, classification 206 also includes the generation of metadata, and applying the categorization rules to existing and newly generated metadata to assign a category. Generated metadata includes values that are derived from an object rather than having been collected during discovery. For example, hash values can be generated and then used to identify duplicate objects. Another example of generated metadata is the case where the objects are examined for specified content such as keywords and/or patterns. This generated metadata, or metadata derived from an object being analyzed, are useful during the classification process.

Existing metadata, on the other hand, can be collected from the objects or from the environment. For example, the owner, size, share, etc., of a file can be collected and used to automatically categorize an object. The collected metadata (both generated metadata and/or existing metadata) can then be used to assign categories relating to the content of the object or the object itself. In some embodiments, a particular object may be associated with more than one category.

In another embodiment, aging considerations or object lifecycle can be a consideration when classifying an object. On the other hand, aging considerations can be a component of service level mapping as discussed below. The aging characteristics or other lifecycle information of a particular object may also be used during the classification process. For example, an annual report is always an annual report. However, newer annual reports may require different services than older annual reports. This aging or lifecycle consideration can be part of classification and/or it can be considered during service level mapping.

One aspect of the present embodiment is the system's ability to recognize independent groupings (domains) of information owners, each of which can configure separate logic for classification and service mapping, even when service options (list of available service levels) are common to all groupings. Thus, whereas conventional information classification systems provide for an object to belong to only one area of service protection, the present invention is more closely tailored to current business models where various groups, or lines of business, may each have different considerations in determining the importance and relevance of information and the service levels each object requires. For instance, an engineering department may have only a cursory interest in the ability to retrieve files associated with each revision of an antiquated product-line, while the legal department may desire the same files to be easily accessible for litigation purposes. Under the embodiment of the present invention, each business line or domain may be associated with a different service level to be considered in determining the importance and relevance of each object within the management scheme.

Methods and systems for classifying objects in a computer system are disclosed in greater detail in U.S. patent application Ser. No. 11/528,772, filed Sep. 27, 2006 and entitled "Information Classification," which application is incorporated herein by reference in its entirety.

C. Service Level Mapping in Information Management

After the objects have been categorized during classification 206, service levels or service level objectives can then be identified for the various objects during service level management 204. Examples of service level objectives include backup, retention, tiered storage, encryption, access control, disaster recovery, and the like or any combination thereof for the objects or for the environment of the computer system. A category can be mapped through configuration data in one example to one or more service level objectives. A category can also be mapped to a lifecycle, each of whose stages may have different service level objectives. There may be several categories involved in the analysis of a single information object, resulting in a variety of service level objectives or possibly conflicting service level objectives. Information management can also resolve conflict, for example, using user supplied logic.

Thus, during the classification process, one or more categories can be assigned to each object as applicable. These categories can then be used to identify the service level objectives and/or the DRM policies that may apply to the various objects. The classification, for example, may have identified a particular object as an annual report. The information management system may be configured to map annual reports to lifecycle L1. If the object in question has aged enough to be in the second stage of that lifecycle, then a service level objective for that stage may dictate that the file needs to be retained for a specific period of time. Alternatively, the classification of the object may also indicate that the object should be retained for some specified period of time, which may be different.

In this manner, the object that has been classified is then processed to identify the various service level objectives (and/or DRM policies) that should apply to the object. The service level objectives can then be bundled together into a target bundle that represents the service level objectives that are desired for the object. Next, service level mapping includes matching the target bundle of services with service packages that are actually available from service providers. If the service level objectives of the current bundle do not match or are not satisfied by the best matching actual service package, then a service gap is present. While embodiments of the invention may be used to select a particular service package, the invention could actually be used to provide services on a per object basis. Service providers, for reasons of practicality, often group services as a package and thus a service package is often selected, but embodiments of the invention extend beyond this particular aspect.

The use of service packages is often used by some entities that manage some or all of their services by restricting the offerings to a number of supported combinations of service levels. In other words, the particular combination of service level objectives may not correspond to a supported service package (also referred to herein as a service bundle). Embodiments of the invention contemplate logic that is used to find a suitable service package that is close enough to what the object needs. The information management system may be able to report that no existing service bundle or service package was sufficient.

In some embodiments of the invention, DRM service level objectives, including encryption and access control, map on a one-to-one basis to the policies installed in the DRM server. For instance, classification may identify a first object as requiring encryption and having a first group of authorized users. In this case, the information management system can map objects within this category to a first DRM policy identifying the first group of authorized users. A second object may require encryption and have a second group of authorized users. The information management system maps objects within this second category to a second DRM policy identifying the second group of authorized users.

As indicated above, a single object can be mapped (per two or more assigned categories requiring DRM) to two or more DRM policies. There are at least two cases of this. First, one DRM policy may address one file operation, while another DRM policy addresses a different file operation. For instance, the first policy may control who can access a file while the second DRM policy controls who can change it. In this case, there is no conflict between the two DRM policies and both can be applied to the object.

Second, two or more DRM policies may address the same file operation, each identifying different authorized users. For example, both policies may control who can delete a file but the authorized users identified in the first DRM policy are different than the authorized users identified in the second DRM policy. In this case, the information management system can resolve the conflict during service level management and come up with a single set of authorized users. In one example, the information management system can refer to priorities for service mappings or DRM policies that can be set by an administrator or other user to resolve conflicts. If conflict resolution is not possible (for example, if two conflicting policies have the same priority, or if priorities have not been set), then the information management system can identify the conflict in a report and ask for assistance in the resolution.

D. Service Orchestration in Information Management

In information management, orchestration of services 208 is the process by which the services are orchestrated. Orchestration can automate multiple service actions and translate an end user service level request to provider action. The workflow needed to execute the services is coordinated during orchestration. Often, action orchestration requires the adapters to communicate with various service providers or with the various services to identify the service that can perform the requested action.

In some embodiments of the invention, service level mapping identifies one or more DRM policies to associate with a data object. In this case, the information management system orchestrates services by identifying the object and the DRM policy to associate with the object to the DRM server. The DRM server can then execute the service by, e.g., encrypting the object in place and enforcing rights associated with the object, as will be described in greater detail below.

IV. Data Classification for Digital Rights Management

Figure 3:
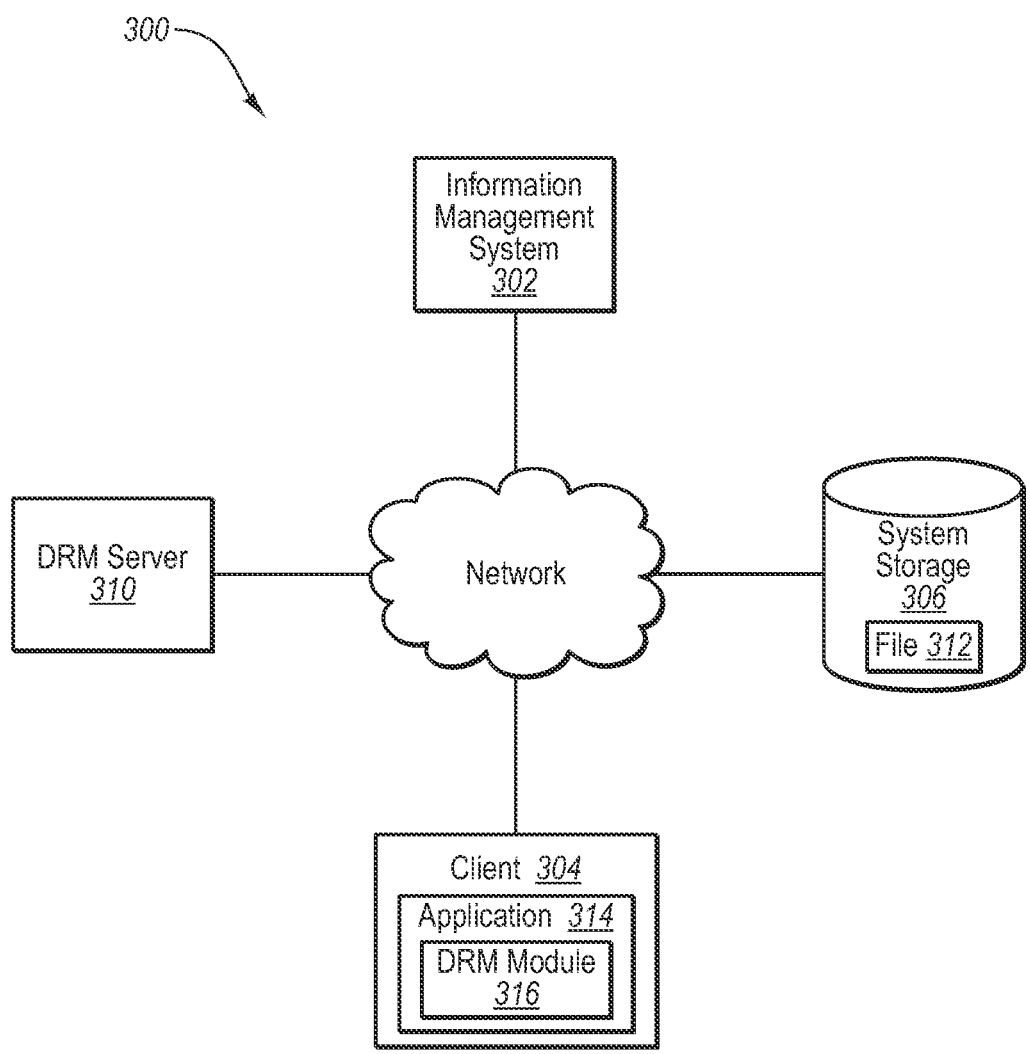
FIG. 3 illustrates one embodiment of a system for using information management to enforce and control rights associated with data.

With reference now to FIG. 3, an example system 300 for leveraging information management to orchestrate and enforce digital rights management in the system 300 is illustrated. The system 300 includes an information management system 302 for managing data, one or more client systems 304 for configuring the information management system 302 and/or accessing data, system storage 306 for storing configuration data, data objects, and the like, and a DRM server 310 for enforcing DRM, which can include encrypting objects and/or providing access control of objects.

The information management system 302 is provided in a network environment and configured through a user interface such as a client computer 304. A system administrator or other user can use the client computer 304 to create configuration data for the information management system 302, including rules to apply during the classification process, such as attributes and content to look for and applicable categories based on attributes and content. For instance, configuration data can include a rule that if certain content (e.g., the term "privileged") is found in an object with certain attributes (e.g., having extension ".doc"), the object belongs to a certain category (e.g., "legal").

A system administrator or other user can also use the client computer 304 to define DRM policies for the DRM server 310. For instance, a DRM policy can identify one or more users who are authorized to perform one or more file operations (such as accessing, changing, and/or deleting a file) on objects associated with the policy. In one embodiment, DRM policies can be included in the configuration data and accessed by the DRM server 310. By coordinating the creation of rules and policies, an entity can precisely define DRM rights associated with data belonging to defined categories.

For instance, an entity may desire to restrict access to legal documents to corporate executives and in-house counsel, while restricting access to documents relating to an entity's intellectual property ("IP"), such as trade secrets and/or patents, to corporate executives and one or more non-executive employees working on the intellectual property. To that end, the entity can define two rules that assign objects having certain attributes identified in the rules to two categories, such as "legal" and "IP". Additionally, the entity can define two DRM policies, one identifying the one or more users that are authorized to access "legal" documents and the other identifying the one or more users that are authorized to access "IP" documents. More generally, rules and policies can be used to define authorized users and permitted file operations (e.g., access, change, and/or delete) to associate with categories of objects.

While the configuration data (e.g., rules, policies) can be user-defined, default configuration data can also be used. In one embodiment of the invention, the information management system 302 can include a plurality of user-selectable configurations. Each of the user-selectable configurations can be directed to a particular industry, such as healthcare, legal, energy, high tech, etc. Typically, the configuration data—whether user-defined or user-selectable—is stored in the system storage 306.

In operation, the information management system 302 identifies objects in need of classification and collects information about them during the discovery and/or classification processes. The information management system 302 uses the collected information and the configuration data (e.g., the rules) to classify the objects, assigning each object to one or more categories. In the present embodiment, at least one of the objects is assigned to a category requiring digital rights management. Further, the classification process may include generating metadata not previously collected during discovery.

Once the categories have been assigned to the various objects, the information management system 302 may then initiate service level mapping. Service level mapping includes identifying service level objectives and/or DRM policies based on the assigned categories of the objects. For example, encryption can be identified as a service level objective for all categories requiring digital rights management, but each category may have a different associated DRM policy. Stated another way, service level objectives for categories requiring digital rights management may each request encryption and identify a corresponding DRM policy to apply. Thus, categories and/or service level objectives can be configured to map on a one-to-one basis to DRM policies. The desired services (e.g., encryption) are then mapped to services that are actually available. In the present embodiment, encryption services are actually available and are provided by the DRM server 310.

Next, the information management system 302 orchestrates the DRM services (e.g., encryption and prevention of unauthorized file operations) for objects in the system 300. As mentioned above, the DRM policies identify one or more users authorized to access, change, and/or delete objects associated with the DRM policies. Thus, orchestrating DRM services may include identifying one or more objects and one or more DRM policies associated with the one or more objects to the DRM server, or some other server configured to provide DRM services. The DRM server can then execute the DRM services for the objects. In some embodiments, executing the DRM services for the objects can include encrypting the objects to enforce DRM. It is understood, however, that encryption is not required to enforce DRM and is merely illustrative of one mechanism that can be implemented by a DRM service to control who can do what to a file.

Figure 4:
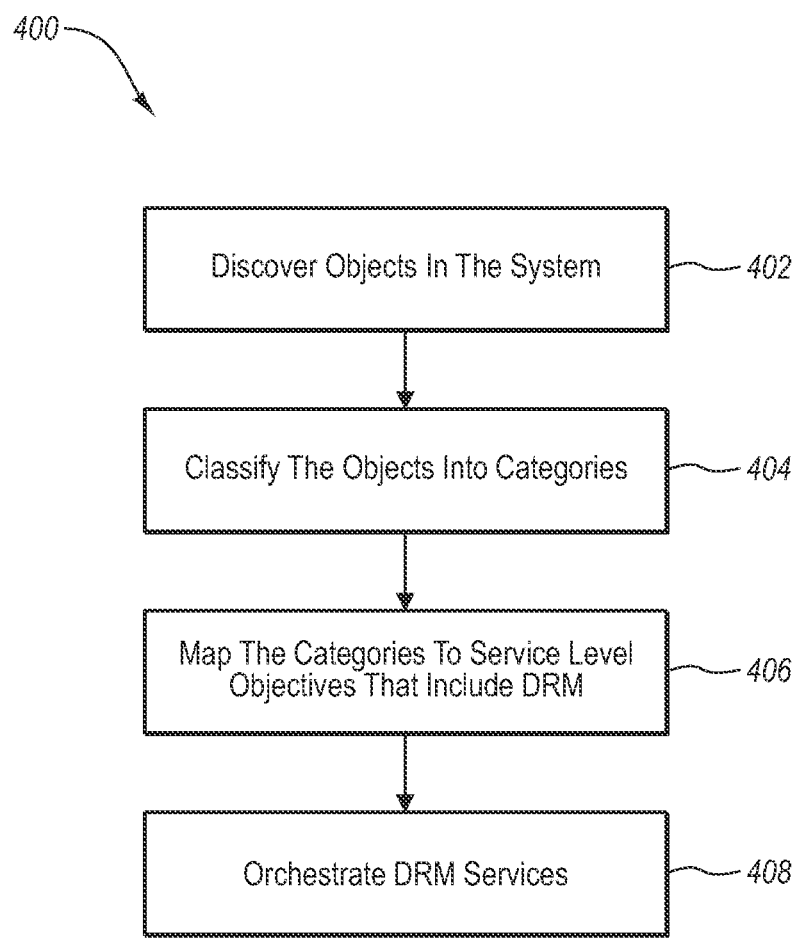
FIG. 4 illustrates one embodiment of a method for using information management to enforce and control rights associated with data.

With additional reference to FIG. 4, a method 400 is depicted for using information management to enforce digital rights management. The method 400 begins after an administrator or other user has defined and/or selected default rules and DRM policies relating to digital rights management. The process 400 begins by discovering 402 objects in the computer system 300. In the present embodiment, the information management system 302 discovers a file 312 in the system storage 306 during the discovery process.

The method 400 continues by classifying 404 objects in the computer system 300 to assign one or more categories to some or all of the objects, the classification being driven by rules, attributes (e.g., file owner) of the objects, and/or content (e.g., keywords) of the objects. During the classification process, the information management system 302 assigns the file 312 to a first category.

After classifying the objects in the computer system 300, the information management system maps 406 the assigned categories to service level objectives to select service levels that include one or more services. For instance, the information management system can map 406 at least one of the assigned categories to a service level objective requesting encryption and identifying an applicable DRM policy. Alternately or additionally, the service level objective can request DRM services without requesting encryption. In the present embodiment, the information management system maps the first category to encryption and a first DRM policy for objects associated with the first DRM policy.

Finally, the information management system orchestrates 408 the services identified during service level mapping, including DRM services, using information from the classification and/or service level mapping steps. To orchestrate DRM services, step 408 may include sending one or more encryption requests to the DRM server 310, each encryption request identifying an object to encrypt and an DRM policy to associate the object with. This includes, in the present embodiment, sending an encryption request to the DRM server 310 identifying the file 312 and the first DRM policy.

After receiving an encryption request, the DRM server 310 locates the file identified in the request and encrypts it in place. Additionally, the DRM server 310 may maintain the encryption and decryption keys used to encrypt and decrypt files. Additionally, the DRM server 310 may maintain a database, in the system storage 306 or elsewhere, identifying which objects are associated with which DRM policies.

One skilled in the art will appreciate that many DRM servers or products 310 currently exist and/or may be developed in the future that can be implemented in conjunction with the information management system 302 to provide DRM services according to embodiments of the invention. The mechanisms used by such DRM servers or products can vary widely and should not be construed as limitations on the invention. For instance, one non-limiting DRM product and/or mechanism operates in the following manner to enforce DRM for objects, such as the file 312. First, the DRM server 310 provides a DRM module 316 to an application 314 that can be used to access the file 312. The application 314 loads the DRM module 316 when running. A user attempts to open the file 312 using the application 314 and the application calls a function in the DRM module. If the function sees that the file 312 is encrypted, it obtains the identity of the user running the application 314 automatically and without user interaction. The module 316 then communicates with the DRM server 312 to ask if the user is authorized to access the file 312.

The DRM server 310 identifies which DRM policies are associated with the file 312 and which users are authorized to open the file according to the DRM policies. This may include checking its database to identify the first DRM policy as being associated with the file 312, and then checking the policies 318 to determine which users are authorized to access the file 312 according to the first DRM policy. If the user attempting to access the file 312 is authorized to do so (e.g., is identified in the first DRM policy), the DRM server 310 provides a decryption key to the DRM module 316, which decrypts the data stream read from the file 312 such that the user can open the file.

Thus, embodiments of the invention permit an entity to enforce and control DRM by leveraging an information management system. Advantageously, this enables sensitive, confidential, and other data for which DRM is desired to be automatically identified to a service that can provide DRM services including encryption and preventing unauthorized access, changing, and deleting of certain files. Further, the information management system can apply rules assigning objects to categories at virtually any level of granularity, which can be used in conjunction with DRM policies to precisely control which users are authorized to perform which file operations on objects assigned to each category.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise physical computer-readable media, including, RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of using information management to provide digital rights management (DRM), the method comprising:
discovering an environment in which DRM can be performed, wherein discovering the environment includes discovering data objects residing in a computer system, and wherein discovery of the data objects is performed using one or more adapters;
repeating part of the discovery process, wherein repeating part of the discovery process includes monitoring the computer system for a change to one or more of the data object;
collecting metadata from each of a plurality of the data objects and generating additional metadata from each data object, wherein the data objects are stored on storage devices in a computer system, wherein at least the additional metadata is generated by applying rules to each of the data objects;
recognizing different groupings associated with the data objects including a first grouping of data objects and a second grouping of data objects;
selecting categorization rules for the data objects, the categorization rules including first rules for the first grouping of data objects and second rules for the second grouping of data objects;
classifying each data object into one or more categories by assigning at least some of the one or more categories based on at least the metadata and the additional metadata, wherein each data object is classified independently of other data objects, wherein a first category included in the one or more categories requires digital rights management, wherein at least some of the data objects are classified in different categories, wherein assigning categories includes applying the categorization rules to each of the data objects by applying the first rules to the first grouping of data objects and by applying the second rules to the second grouping of data objects, and wherein a classification of a data object is used as a basis to evaluate a cost associated with implementation of a desired service level for that data object;
mapping the data objects to service level objectives based on the categories associated with the data objects, wherein the service level objectives include first and second DRM service level objectives that are different from each other, wherein data objects associated with the first category are mapped to one or more of the DRM service level objectives and the data objects classified in categories other than the first category are mapped to service level objectives different from the DRM service level objectives;
mapping the first and second DRM service level objectives to selected respective first and second DRM policies so that objects which have been mapped to a DRM service level objective are also mapped to a DRM policy, wherein selection of one or the other of the first and second DRM policies for mapping is based on a difference between the first and second DRM service level objectives;
mapping the first DRM service level objective and the second DRM service level objective to services that are actually available from service providers that best match the first DRM service level objectives and the second DRM service level objectives, wherein a service gap is present when the first DRM service level objective or the second DRM service level objective does not match or is not satisfied by the services to which the first DRM service level objective is mapped or to which the second DRM service level objective is mapped; and
orchestrating services associated with the DRM service level objectives such that a first data object receives DRM services associated with the first DRM service level objective and second data object receives DRM services associated with the second DRM service level objective, wherein the DRM services provided to the first data object are different from the DRM services provided to the second data object.

2. The method of claim 1, wherein the first DRM policy to which the DRM service level objective is mapped identifies a first set of one or more users authorized to perform one or more file operations on data objects associated with the first DRM policy.

3. The method of claim 2, wherein the second DRM policy to which the DRM service level objective is mapped identifies a second set of one or more users authorized to perform one or more file operations on data objects associated with the second DRM policy.

4. The method of claim 3, wherein the first set of one or more users is different from the second set of one or more users.

5. The method of claim 2, wherein a file operation comprises accessing, changing, or deleting a data object.

6. The method of claim 1, wherein orchestrating DRM services for the first data object classified into the first category comprises providing an encryption request to a digital rights management server, wherein the encryption request identifies the first data object and a DRM policy to which the DRM service level objective for the first data object has been mapped.

7. The method of claim 6, wherein the digital rights management server encrypts the first data object and enforces the DRM policy by preventing the first data object from being decrypted except by the one or more users authorized to perform the one or more file operations on data objects associated with the DRM policy.

8. The method of claim 1, wherein mapping the data objects to service level objectives includes:
mapping a single data object to two or more conflicting policies; and
resolving the conflict based on a priority.

9. A physical storage device having stored therein computer-executable instructions which, when executed by a computing system, provide digital rights management (DRM) for objects, wherein digital rights management comprises:
discovering an environment in which DRM can be performed, wherein discovering the environment includes discovering a server, service, application, and data objects residing in a computer system, and wherein discovery of the server, service, application and data objects is performed using one or more adapters;
repeating part of the discovery process, wherein repeating part of the discovery process includes monitoring the computer system for a change to one or more of a server, service, application or data object;
collecting metadata from each of a plurality of data objects and generating additional metadata from each data object, wherein the data objects are stored on storage devices in a computer system, wherein at least the additional metadata is generated by applying rules to each of the data objects;
recognizing different groupings associated with the data objects including a first grouping of data objects and a second grouping of data objects;
selecting categorization rules for the data objects, the categorization rules including first rules for the first grouping of data objects and second rules for the second grouping of data objects;
classifying each data object into one or more categories by assigning at least some of the one or more categories based on at least the metadata and the additional metadata, wherein each data object is classified independently of other data objects, wherein a first category included in the one or more categories requires digital rights management, wherein at least some of the data objects are classified in different categories;
applying categorization rules to each of the data objects to assign categories by applying the first rules to the first grouping of data objects and by applying the second rules to the second grouping of data objects, and wherein a classification of a data object is used as a basis to evaluate a cost associated with implementation of a desired service level for that data object;
mapping the data objects to service level objectives based on the categories associated with the data objects, wherein the service level objectives include first and second DRM service level objectives that are different from each other, wherein data objects associated with the first category are mapped to one or more of the DRM service level objectives and the data objects classified in categories other than the first category are mapped to service level objectives different from the DRM service level objectives;
mapping the first and second DRM service level objectives to selected respective first and second DRM policies so that objects which have been mapped to a DRM service level objective are also mapped to a DRM policy, wherein selection of one or the other of the first and second DRM policies for mapping is based on a difference between the first and second DRM service level objectives;
mapping the first DRM service level objective and the second DRM service level objective to services that are actually available from service providers that best match the first DRM service level objectives and the second DRM service level objectives, wherein a service gap is present when the first DRM service level objective or the second DRM service level objective does not match or is not satisfied by the services to which the first DRM service level objective is mapped or to which the second DRM service level objective is mapped; and
orchestrating services associated with the DRM service level objectives such that a first data object receives DRM services associated with the first DRM service level objective and a second data object receives DRM services associated with the second DRM service level objective, wherein the DRM services provided to the first data object are different from the DRM services provided to the second data object.

10. The physical storage device of claim 9, wherein the first DRM policy to which the DRM service level objective is mapped identifies a first set of one or more users authorized to perform one or more file operations on data objects associated with the first DRM policy.

11. The physical storage device of claim 10, wherein the second DRM policy to which the DRM service level objective is mapped identifies a second set of one or more users authorized to perform one or more file operations on data objects associated with the second DRM policy.

12. The physical storage device of claim 11, wherein the first set of one or more users is different from the second set of one or more users.

13. The physical storage device of claim 10, wherein a file operation comprises accessing, changing, or deleting a data object.

14. The physical storage device of claim 9, wherein orchestrating DRM services for the first data object classified into the first category comprises providing an encryption request to a digital rights management server, wherein the encryption request identifies the first data object and a DRM policy to which the DRM service level objective for the first data object has been mapped.

15. The physical storage device of claim 14, wherein the digital rights management server encrypts the first data object and enforces the DRM policy by preventing the first data object from being decrypted except by the one or more users authorized to perform the one or more file operations on data objects associated with the DRM policy.

16. The physical storage device of claim 9, wherein mapping the data objects to service level objectives includes:
  mapping a single data object to two or more conflicting policies; and
  resolving the conflict based on a priority.

* * * * *